(12) United States Patent
Van Der Tempel et al.

(10) Patent No.: US 12,212,871 B2
(45) Date of Patent: Jan. 28, 2025

(54) PIXEL SENSOR SYSTEM

(71) Applicant: VOXELSENSORS SRL, Brussels (BE)

(72) Inventors: Ward Van Der Tempel, Keerbergen (BE); Johannes Willern Peeters, Antwerp (BE); André Bernard Miodezky, Ukkel (BE)

(73) Assignee: VOXELSENSORS SRL, Brussels (BE)

( * ) Notice: Subject to any disclaimer, the term of this patent is extended or adjusted under 35 U.S.C. 154(b) by 232 days.

(21) Appl. No.: 17/928,249

(22) PCT Filed: May 28, 2021

(86) PCT No.: PCT/IB2021/054688
§ 371 (c)(1),
(2) Date: Nov. 28, 2022

(87) PCT Pub. No.: WO2021/240455
PCT Pub. Date: Dec. 2, 2021

(65) Prior Publication Data
US 2023/0217136 A1   Jul. 6, 2023

(30) Foreign Application Priority Data

May 29, 2020 (BE) .................................. 2020/5385
Aug. 7, 2020 (BE) .................................. 2020/5564

(51) Int. Cl.
*H04N 5/378* (2011.01)
*H04N 25/441* (2023.01)
(Continued)

(52) U.S. Cl.
CPC ......... *H04N 25/773* (2023.01); *H04N 25/441* (2023.01); *H04N 25/626* (2023.01)

(58) Field of Classification Search
CPC ........ H04N 23/00; H04N 23/30; H04N 23/20; H04N 23/40; H04N 23/50; H04N 23/45;
(Continued)

(56) References Cited

U.S. PATENT DOCUMENTS

2011/0168909 A1   7/2011   Nakao
2012/0257789 A1   10/2012  Lee et al.
(Continued)

FOREIGN PATENT DOCUMENTS

JP   H07302928 A    11/1995
JP   2010078338 A   4/2010
(Continued)

OTHER PUBLICATIONS

International Search Report mailed Mar. 5, 2022, for PCT Application No. PCT/EP2021/087594, filed Dec. 23, 2021, four pages.
(Continued)

*Primary Examiner* — Don K Wong
(74) *Attorney, Agent, or Firm* — Morrison & Foerster LLP

(57) ABSTRACT

The present invention relates to a high-speed imaging sensor system in which single-photon detectors are provided in an architecture adapted for high-speed processing of the output of the detectors with high reliability to filter out false positives.

19 Claims, 3 Drawing Sheets

(51) Int. Cl.
*H04N 25/626* (2023.01)
*H04N 25/773* (2023.01)

(58) Field of Classification Search
CPC ............ H04N 23/555; H04N 1/00681; H04N 1/00795; H04N 1/00835; H04N 1/00; H04N 1/00111; H04N 1/00246; H04N 1/00729; H04N 1/00734; H04N 1/00742; H04N 25/00; H04N 25/40; H04N 25/47; H04N 5/378; H04N 5/379
See application file for complete search history.

(56) References Cited

U.S. PATENT DOCUMENTS

| | | |
|---|---|---|
| 2018/0225521 A1 | 8/2018 | Harris et al. |
| 2018/0262705 A1 | 9/2018 | Park et al. |
| 2020/0326414 A1 | 10/2020 | Delic |
| 2021/0075986 A1* | 3/2021 | Panicacci ................ G01S 17/10 |

FOREIGN PATENT DOCUMENTS

| | | |
|---|---|---|
| WO | 2013018006 A1 | 2/2013 |
| WO | 2019060942 A1 | 4/2019 |
| WO | 2020127927 A1 | 6/2020 |

OTHER PUBLICATIONS

International Preliminary Report and Written Opinion dated Jun. 13, 2023, for PCT Application No. PCT/EP2021/087594, filed Dec. 23, 2021, ten pages.
International Preliminary Report and Written Opinion dated Nov. 17, 2022, for PCT Application No. PCT/IB2021/054688 filed May 28, 2021, six pages.
Japanese Notice of Reasons for Refusal mailed Aug. 20, 2024, for JP Patent Application No. 2023-537617, with English translation, 14 pages.

* cited by examiner

PIXEL SENSOR SYSTEM

CROSS REFERENCE TO RELATED APPLICATIONS

This application is a national stage application under 35 U.S.C. § 371 of International Application No. PCT/IB2021/054688, filed internationally on May 28, 2021, which claims priority to Belgium Patent No. 2020/5564, filed Aug. 7, 2020 and Belgium Patent No. 2020/5385, filed May 29, 2020, the entire contents of which is incorporated herein by reference.

TECHNICAL FIELD

The invention relates to an improved system and improved method for high-speed imaging, in which an environment can be reliably captured in limited time spans and very limited photon budgets.

PRIOR ART

In the prior art, in scanning active imaging, a light beam, typically a laser, is moved over an area to be captured, and the location where the beam impinges is recorded at each point in time via multiple image sensors. By processing the differences in location from the different points of view (sensors), the effective distance to the illuminated target can be determined, via triangulation. Such a measurement captures a voxel. The speed at which this process can be carried out, the voxel rate, is limited on the one hand by the speed at which scanning with the light beam takes place, but on the other hand is also (the most strongly) limited by the processing time required by the sensors to detect the reflected light beams, especially in relation to background radiation (ambient light) and general thermal noise. By specifically tackling this second issue, imaging can be significantly accelerated.

In order to achieve a voxel rate of tens or even hundreds of millions of voxels per second, each voxel must be captured in a time span of at most 10 ns. As a result, the sensor must also be suitable for operating with limited photon budgets (i.e. detected photons incident on the sensor that are sufficient for a detection), such as, for example, 10 photons. Given the limited time span for processing, only a limited number of photons can be captured.

Existing image processing and imaging systems process optical input acquired by the sensors either in parallel for all pixels, in the case of a so-called 'global shutter', or spread over time in the case of 'rolling shutter'. In both cases, typical imaging systems have a gain factor of 10 $\mu V$ to 1 mV per incident electron, in order to achieve a signal that exceeds a minimum detection voltage and can be recorded. In the above range, it should be noted that the upper limit of this can only be guaranteed by more recent imagers, which have been specifically modified to count photons, and focus on very low detection rates. With such specialised sensors, a 10 mV signal can be produced for 10 electrons, which can be read positively for a particular pixel. In order to detect an incident photon packet, a minimum number of 10 photons is required, which moreover therefore impinge on the sensor in a time span of 10 ns. What has been done in the prior art so far is to limit the exposure time of the sensor, for example to 10 ns, and then read the sensor to trigger an event via a threshold voltage (i.e. true incidence of reflected beam instead of a false positive from ambient light or thermal noise). The disadvantage of this is that, especially with high-resolution imagers, the time required to read the sensor dominates the process, and is typically significantly higher than 10 ns, causing a bottleneck here.

An alternative is to let the sensor decide for itself whether a minimum number of photons has been detected within a certain time span, which amounts to the detection of a voxel, instead of reading the sensor and deciding on the basis of the data read whether or not an event took place. However, a problem with this is that the time it takes for the sensor to evaluate whether or not an event has occurred is still too high, and currently in the most recent versions, such as the Prophesee sensors, is still at least 1 $\mu s$. Moreover, in such embodiments it is almost impossible to distinguish false positives, due to ambient light or thermal noise, from true events. WO 2013/018006 describes a detector array with SPAD detectors to detect photon incidence. However, the system is not suitable for achieving the object of the present invention, which is to reduce false positives. WO '006 uses an aggregation of the signals from SPADs in rows and columns to determine the precise position in this way without reading each SPAD separately. However, this still creates a lot of signals from ambient noise and the like that are impossible to filter out.

US 2012/257789 describes signal processing in events originating from a sensor output that recognises motion and identifies clusters of motion via space/time conditions. However, the input used for this is only processed in post-processing of the signals, which is avoided in the present invention (takes place in pre-processing). US '789 therefore passes on all sensor data 'blindly', so that the bottleneck once again lies with post-processing.

US 2018/262705 describes a technique for detecting defective pixels, wherein time-based conditions can be used. However, the application is by no means suitable for solving the present problem.

Neither document describes any SPDs or SPADs anywhere, while the problem solved in the present invention mainly has to do with the intrinsic features of SPDs, and especially with SPADs, namely a lot of noise due to ambient light and the like.

Currently, there are no systems of sensor architecture capable of achieving the desired detection rates under the proposed features such as photon budget.

The present invention aims to find a solution for at least some of the above problems.

SUMMARY OF THE INVENTION

The invention relates to a high-speed sensor system according to the claims. The current architecture concerns a system in which highly sensitive sensors, such as SPADs (single-photon avalanche diodes) are used to detect events at very low photon budgets, which allows a very short scanning time, whether or not real detections or false detections by ambient light or thermal noise. The combination of these features makes it possible to perform imaging very quickly, even at high resolutions.

DETAILED DESCRIPTION OF THE INVENTION

Figure 1:
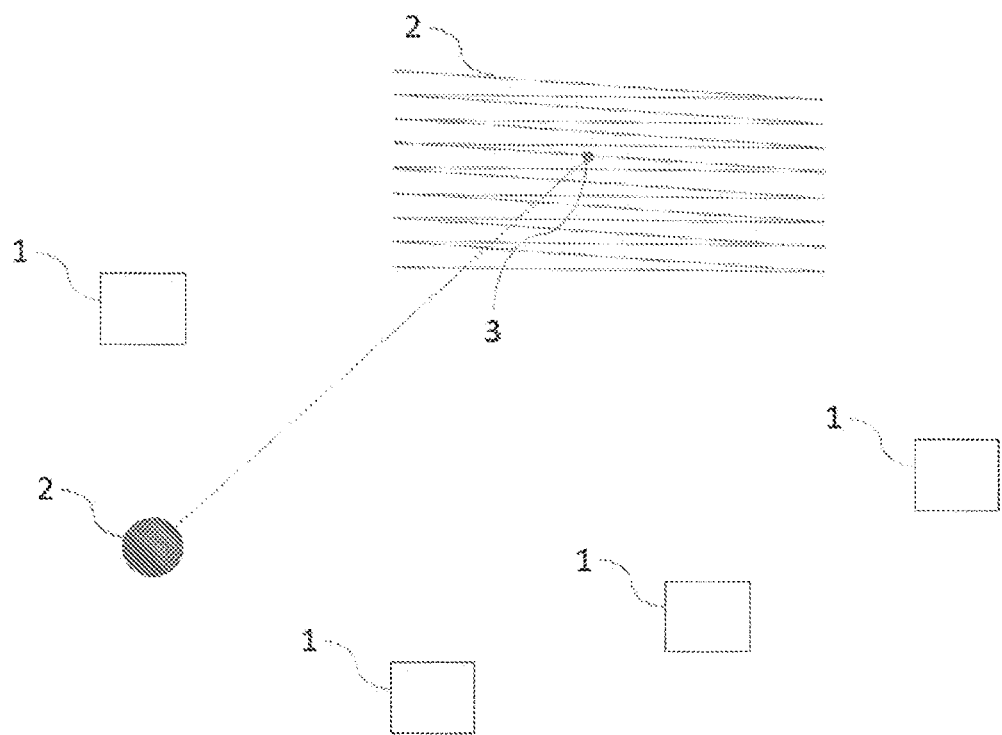
FIG. 1 shows a schematic representation of a rudimentary version of the system according to the invention.

Unless otherwise defined, all terms used in the description of the invention, including technical and scientific terms, have the meaning as commonly understood by a person skilled in the art to which the invention pertains. For a better understanding of the description of the invention, the following terms are explained explicitly.

In this document, 'a' and 'the' refer to both the singular and the plural, unless the context presupposes otherwise. For example, 'a segment' means one or more segments.

When the term 'around' or 'about' is used in this document with a measurable quantity, a parameter, a duration or moment, and the like, then variations are meant of approx. 20% or less, preferably approx. 10% or less, more preferably approx. 5% or less, even more preferably approx. 1% or less, and even more preferably approx. 0.1% or less than and of the quoted value, insofar as such variations are applicable in the described invention. However, it must be understood that the value of a quantity used where the term 'about' or 'around' is used, is itself specifically disclosed.

The terms 'comprise', 'comprising', 'consist of', 'consisting of', 'provided with', 'have', 'having', 'include', 'including', 'contain', 'containing' are synonyms and are inclusive or open terms that indicate the presence of what follows, and which do not exclude or prevent the presence of other components, characteristics, elements, members, steps, as known from or disclosed in the prior art.

Quoting numerical intervals by endpoints comprises all integers, fractions and/or real numbers between the endpoints, these endpoints included.

In a first aspect, the invention relates to a high-speed imaging sensor system, the system comprising one or more light sources, and comprising an array having a plurality of single-photon detectors (or SPDs), which detectors are spatially distributed throughout the array in a substantial matrix form, preferably at regular intervals from each other, wherein the SPD are capable of detecting single photons, and registering detection of the single photon with a detection signal; the system further comprising a plurality of row buses and column buses, and wherein the detectors are grouped in rows and/or columns, and wherein the detectors per row are connected to one or more row buses and/or wherein the detectors per column are connected to one or more column buses on the column bus for aggregating signals from the detectors, wherein per row bus only detectors from one of the rows are connected to the row bus for aggregating signals from the detectors, wherein per column bus only detectors from one of the columns are connected; the system further comprising an evaluation circuit, wherein the row buses and the column buses are connected to the evaluation circuit, the evaluation circuit being adapted to evaluate the aggregated signals from the row buses and the column buses against predetermined confirmation patterns to confirm the detection of an incident photon and location-determination thereof, said confirmation patterns comprising temporal and/or spatial conditions, and wherein a detection is confirmed on the basis of a compliance of the row bus and column bus signals with a predetermined pattern.

Until now, single-photon detectors have been used very little due to their high sensitivity, which means that false positives have too much impact on the imaging. In addition, to remove these false positives, further processing of the output of the SPDs is required, and the processing speed is reduced and the benefits of SPDs are de facto negated. The present invention succeeds in filtering out false-positive detection signals by, on the one hand, limiting the input to be processed by grouping the sensors and aggregating the individual signals (row buses and column buses) and processing them in this way, wherein false events are removed on the basis of predefined confirmation patterns. In this way, the (relative) location of the detecting sensor can also be determined from the aggregated info. The evaluation circuit thereby checks the signals from the buses (row and column) and matches them to the confirmation patterns to remove false positives. These confirmation patterns may include spatial and/or temporal conditions, spatial conditions being related to the (relative) position of the sensors (and/or their column and/or row buses) whose signal indicates a detection. For example, upon receipt of a signal indicating a detection from two column buses (and/or from two row buses) whose sensors are adjacent (for example, column 17 and 18), this can be interpreted as confirmation that it is not a random misfire due to thermal noise for example. Whether or not combined with this, temporal conditions can also be imposed that are related to the (absolute and/or relative) time at which signals indicate a detection, such as the requirement that only upon receipt of two (or more) signals indicating a detection within a predetermined period of time, this is interpreted as a real event and detection, and is thus confirmed.

The applicant noted that in most prior art systems, either the evaluation circuit received too much input to process and thus could no longer perform the scheduled 10 ns time frame, or the sensors themselves were modified to provide the data pre-processing, resulting in solutions that are particularly impractical and/or expensive, as more sophisticated sensors or add-ons are required to enable this functionality. Moreover, it is not possible for the sensors themselves to reliably process the signals without taking into account the input from other sensors. To solve this, all sensors would have to be interconnected in terms of input, which as mentioned has a high impact on cost price as well as energy efficiency, speed and compactness.

In a preferred embodiment, the spatial conditions comprise detecting an aggregated signal comprising a detection signal from at least two column buses associated with adjacent columns in a predetermined time window, and detecting an aggregated signal comprising a detection signal in at least two row buses associated with adjacent rows in a predetermined time window.

The use of spatial conditions can be applied, for example, in the form of so-called coincidence detection, in which the (relative and/or absolute) physical location of the origin of several 'positive' signals is compared in order to be able to confirm these on the basis of probabilistic estimates. For example, in certain circumstances it can be expected that neighbouring or adjacent column groups or row groups (possibly with an additional limitation in terms of 'length', the number of sensors per group) have a certain chance of a (substantially) simultaneous (in the same time span) positive signal that is negligible, for example in conditions with limited ambient light. In other circumstances, the conditions can be made stricter to avoid false positives, for example by requiring three or more adjacent groups to speak of a confirmed detection. Additionally or alternatively, requirements can also be set about the strength of the signals (threshold value) of the buses needed to constitute a positive detection, which further depends on the type of sensor and sensitivity, as well as variation in the gain of the sensor.

Preferably, use is made of the relative location of the detectors associated with the column buses and row buses in order to be able to verify the spatial conditions. Typically, an array is regularly subdivided, with a fixed number of detectors per column bus and a fixed number of detectors per row bus (whether or not equal for row buses and column buses), which greatly simplifies logic programming for verifying spatial conditions. Once a detection signal has been confirmed, the effective location can then be easily determined from the known position of the detectors of row and column buses. Aggregating the signals from several detectors into one signal for a column or row bus greatly lightens the computational requirements. The disadvantage that is normally connected to this is that some of the information is lost, namely that detection can only be confirmed for a group of detectors connected to the column or row bus, but that it is not possible to detect which detector(s) is/are involved specifically. However, by doing this for both row and column buses, a detection can be located along the column buses (equivalent to an X coordinate in the array) and a detection located along the row buses (equivalent to a Y coordinate in the array), and together giving an approximate 2D position for the location of the detection.

In a preferred embodiment, the temporal conditions comprise a temporal overlap of detecting an aggregated signal comprising a detection signal from at least one row bus, and preferably at least two row buses associated with adjacent rows, and of detecting an aggregated signal comprising a detection signal from at least one, and preferably at least two column buses associated with adjacent columns, the location of the incidence of the photon on the array being determined on the basis of the column buses and row buses associated with a confirmed detection.

Again, the temporal conditions can be set more strictly or looser depending on the circumstances, and in certain situations even dynamically in such a way that they automatically adjust based on, for example, average detection of (whether or not false-positive) signals in the buses per unit of time.

In general, the temporal conditions require that, in order to confirm a detection, the separate detection signals from row bus(es) and column bus(es) overlap, meaning here that the beginning (leading edge) of the detection signals fall within a predetermined time span of each other, less than 100 ns, such as, for example, less than 50 ns, or preferably even less than 10 ns, 5 ns, 2.5 ns, 2 ns, 1.5 ns, 1.0 ns, or even less. Preferably, the detection signals overlap to a substantial extent (at least 25%, preferably at least 50% or even 75% overlapping). This requirement ensures that random signals due to thermal noise and the like are statistically unlikely as they would have to be detected almost simultaneously in two different detectors. To increase this reliability, the predetermined time span can be narrowed and/or the degree of overlap, and/or any other factors. Based on this, it is also possible to verify whether separate events are involved in case of detection on several row buses and/or column buses. Finally, upon detection on multiple row buses and multiple column buses, the correct matching can also be performed between the different column buses and row buses by comparing the degree of overlap. If e.g. at t=0.075 ns a signal is detected on column bus 208, and at t=2.45 ns on column bus 472; and at t=2.38 ns on row bus 171 and at t=0.081 ns on row bus 23, it can be deduced that most likely two events have been detected, one at position (row bus/column bus) 208/23 and one at position 472/171.

A second temporal correlation is applied between successive time windows. After all, with a scanning system it is to be expected that, if for instance a correct detection has taken place in time window 1, with detected position, for instance [10,100], the expected detection coordinates for time window 2 will be close to this. In this way, a consideration can be made to keep detections that are far from the previous detected coordinate under consideration and/or to confirm them as true or false with possible future information. In this way, a spatio-temporal pattern can be sought in the detections over a number of time windows that should match or closely resemble the expected pattern according to the scanning pattern of the light source. The concept of the invention thus reduces the computational load, by aggregating signals from detectors, allowing effective events to be detected quickly for a given bus, and then manages to retrieve the precise location of the event by ingeniously using additional constraints.

In a particular preferred embodiment, the evaluation circuit comprises one or more simple circuits that evaluates the aggregated signals from two or more adjacent row buses/column buses, and only confirms a detection if the aggregated signal from two or more adjacent row buses shows a detection, and/or the aggregated signal from two or more adjacent column buses shows a detection. For example, the evaluation circuit may be provided as separate circuits that receives the aggregated signals from two (or more, depending on requirements) row buses/column buses as inputs, and confirms them when both (or all N) are positive (i.e. showing a detection). One way to do this is to use logic AND gates, or multiple transistors—used as switch—in the circuit, so that a positive output only follows two positive inputs. Each 'group' of buses (depending on the spatial conditions) is connected to a transistor, which can confirm or reject a detection for that group. If it is stipulated that more than two adjacent buses display a positive aggregated signal for confirmation, this can be done by means of several transistors connected in series, for example. Other realisations of this also form part of the invention, and the above example is for illustrative purposes only.

With the detections confirmed by the evaluation circuit, it is then possible to simply determine the physical location on the array (row buses and column buses allow simple x-y positioning) which records the true detections and passes it on to the processing layer, and does not pass on the false positives.

From this, macropixels can be defined that are M by N SPADs in size, in which confirmed detections can be located. For example, if an aggregated signal representing a detection is generated in row 17 and 18 in a coincident time period, and in that time period also in columns 33 and 34, a detection can be confirmed in the macropixel (17-18; 33-34) of 2 by 2 SPADs. Depending on the spatial requirements, the size of the macro pixels can vary, such as 2×1, 1×2, 3×2, 2×3, 3×3, 3×1, 1×3, etc. Also, in some cases it can be opted to narrow (in post-processing) the location of the confirmed detection to the centre of the macropixel, particularly when more than 2 adjacent detections are required.

In specific embodiments, the evaluation circuit can be adjusted between different spatial and/or temporal conditions for confirmation, i.e. a longer interval for adjacent aggregated signals to indicate a detection (by adding a circuit that converts a 'positive' aggregated signal—or even a positive signal per detector—into a controllable signal of fixed length in time and amplitude), or an adjustment of the number of adjacent aggregated signals indicating a detection.

WO '006 describes a SPAD array where the SPADs per row and column are connected to OR gates, and then the row and column where a signal was detected are coupled to locate the impact of a photon. Of course, this does not take into account the current problem, namely false positives, and so a lot of noise is passed on to the processing layer. The present invention rejects these erroneous results by imposing additional conditions, namely a multiple detection, by two or more adjacent rows/columns.

Particularly preferably, the spatial conditions comprise detecting an aggregated signal comprising a detection signal from at least two column buses associated with adjacent columns in a predetermined time window, and detecting an aggregated signal comprising a detection signal in at least two row buses associated with adjacent rows in a predetermined time window, and wherein said confirmation patterns comprise temporal and spatial conditions.

By imposing both spatial and temporal conditions, the reliability of confirmation of detection is greatly improved. Moreover, in this way it is also possible to correctly interpret multiple events in a time span as discussed in previous sections.

In a preferred embodiment, each SPD is uniquely connected with one column bus and uniquely connected with one row bus. The advantage here is that the number of detectors is limited, and the location can be determined more accurately (X and Y coordinate). For example, in a row with 20 SPDs associated therewith, the first 5 SPDs can be connected to a first row bus for that row, the second 5 to a second row bus for that row, and the next sets of 5 to a third and fourth row bus for that row. Each SPD is therefore only connected to one row bus, but conversely, the row buses can be connected to several SPDs.

In an alternative preferred embodiment, each SPD is uniquely connected with either one column bus or one row bus. Such a system will be simpler in architecture, but will use more detectors. A strong advantage, however, is that 'false' detections on a detector (e.g. due to ambient light and the like) will typically not be passed to both column and row bus associated with the detector, as in the previous embodiment, although such false positives can be filtered out via other conditions (such as requirement that 2 or more adjacent buses must receive a detection signal).

In a further preferred embodiment, the array comprises M by N single-photon detectors, which are positioned in a matrix with M rows and N columns, wherein per row the SPDs are distributed over two or more row groups of SPDs, preferably consecutive in the row, and where the same distribution of the SPDs per row continues over all rows, wherein the SPDs of a row group are connected to a row bus associated with the row group, and wherein the spatial conditions additionally involve detecting an aggregated signal comprising a detection signal in at least two row buses associated with adjacent row groups in a predetermined time window. For example, there are a maximum of M row buses and N column buses, but in practice far fewer, since several SPDs are grouped per row and column bus.

In certain circumstances, at very high resolutions, the number of detectors per row is very high, and it is computationally more efficient to further divide the detectors per row into a number of row groups per row (preferably where each detector can belong to only one row group, although options exist where some or even all detectors belong to two or more row groups), each row group having its own associated row bus. Preferably, each bus manages between 1 and 20 detectors, more preferably between 2 and 10, still more preferably between 2 and 5, or even between 2 and 4. This limits the number of multiple events on a row bus per time span, so that this differentiation requires less computing power. In addition, with a very large number of detectors per row without subdivision into row groups, the chance increases that several detectors detect an event quasi-simultaneously and this cannot be differentiated afterwards, or with limited certainty, when aggregating the signals to the row bus. A suitable choice of number of detectors per row group will greatly limit this problem, and an optimised number can be determined on the basis of statistical observations, which may also depend on the application of the array (much or little ambient light). In particular embodiments, the number of detectors per row group can also be dynamically or manually adjusted to accommodate the circumstances. Thus, there may be a number of predetermined distributions between which to choose.

In a further preferred embodiment, the array comprises M by N single-photon detectors, which are positioned in a matrix with M rows and N columns, wherein per column the SPDs are distributed over two or more column groups of SPDs, preferably consecutive in the column, and wherein the same distribution of the SPDs per column continues over all columns, the SPDs of a column group being connected to a column bus associated with the column group, and wherein the spatial conditions additionally involve the detection of an aggregated signal comprising a detection signal in at least two column buses associated with adjacent column groups in a predetermined time window.

The same reasoning as described earlier for the division of the detectors in a row into row groups applies here. Particularly preferably, both distributions (row groups and column groups) are combined as described above.

Alternatively, the detectors can be alternately assigned to the multiple row buses and/or column buses, which offers advantages in the coincidence determination. For example, with an impact that triggers several contiguous detectors in one row (which often happens), this will lead to two or more row buses associated with the row detecting a detection. With a sequential distribution, this will lead to only one row bus being triggered (unless it concerns just two detectors located on the transition between two row groups).

In a preferred embodiment, the SPDs are adapted to provide a signal to the connected row bus and/or column bus, said signal being substantially binary in nature and representing whether or not the SPD detects incident photons.

In a preferred embodiment, the system is adapted to precharge the row buses and column buses at fixed intervals, the row buses and column buses being adapted to discharge upon receipt of an aggregated signal comprising a detection signal.

In a preferred embodiment, the evaluation circuit is adapted to check spatial consistency, wherein a last determination of the location of the photon incidence on the array is compared with one or more previous location-determinations, and wherein the evaluation circuit rejects the latest location-determination upon detection of a spatial discrepancy between the latest location-determination and the previous location-determinations above a predetermined, dynamic or non-dynamic, upper limit.

With the above adjustment, on the basis of historical data, namely 'known' incidence position of the reflected beam, a rough filtering can be performed that removes false signals without much computing power being spent on this in further processing.

In a preferred embodiment, the system comprises a synchronisation component for synchronising the signals from the detectors.

In order to determine the disparity between the detectors and the light sources, a synchronisation component is provided which temporally aligns and synchronises them. This can be achieved, among other things, by physically connecting the elements (detectors and light sources) via cable and providing the elements with a synchronisation signal via the cable. Alternatively, the optical signal (signal from the light sources) can itself provide a synchronisation moment that is obtained during acquisition. This can be done, among other things, by pulsing the optical signal according to a predetermined pattern that is 'recognised', for example as the start of the scanning, wherein all sensors can use this as a local time 0, and are thereby mutually synchronised, as well as with respect to the light sources.

In a preferred embodiment, the system is adapted to only consider signals from a variable subset of the detectors in the evaluation circuit during imaging during a portion of an imaging procedure and not consider signals from detectors in the subset, wherein the system selects the detectors in the subset based on previous location-determinations and optionally based on orientation and/or positioning of the one or more light sources, wherein the detectors in the subset comprise a maximum of 25%, preferably a maximum of 10%, of the total number of detectors, and the detectors in a subset are grouped together.

In practice, most of the detectors on the array will not experience an event per time span. By adapting the system to only process signals from a part of the detectors in the evaluation circuit (and thus effectively ignoring a part), the computational burden can be greatly reduced. The difficulty lies in the fact that it is not possible to determine with certainty in advance which detectors may be ignored. Therefore, on a statistical basis and historical data, an estimate can be made of possible variation of the incidence position of the reflected beam or beams on the array, relative to the previously detected incidence positions, and preferably also based on the scanning pattern of the light source(s). Taking this into account, a zone of interest can be defined where the reflected beam will impinge with a predetermined statistical probability, not considering detectors outside this zone of interest. This zone of interest may be substantially circular, oval, rectangular, or jagged in pattern. In this way, a substantial part of the detectors, especially in the case of very large arrays, need not be taken into account in the processing. The determination of the zone of interest, in certain embodiments, may also take into account detections in several of the foregoing time spans, so as to recognise a pattern therein which can be taken into account in predicting the zone of interest.

A very big, additional advantage of limiting to a subset of the detectors that are active/taken into account is that in this way also a large number of false positives (due to thermal noise and the like) are not processed.

In a preferred embodiment, the system is adapted to activate only a variable subset of detectors during imaging during a portion of an imaging procedure and not deactivate detectors in the subset, wherein the system selects the detectors in the subset based on previous location-determinations and optionally based on orientation and/or positioning of the one or more light sources, wherein the detectors in the subset comprise a maximum of 25%, preferably a maximum of 10%, of the total number of detectors, and the detectors in a subset are grouped together.

In a preferred embodiment, the detectors comprise single-photon avalanche diodes (SPAD), and are preferably SPADs.

SPADs are semiconductor photodetectors that use a very high reverse voltage, such that impact ionisation takes place upon detection, causing an avalanche effect, and thus a high current that grows very quickly. The choice for SPADs is partly based on the speed at which the impact ionisation is achieved, and the simple 'resetting' of these detectors.

In a preferred embodiment, the detectors are provided with a quenching circuit which normalises the detection signal from the detectors.

The presence of a quenching circuit is necessary to reduce the signals (avalanche current), to reset the detectors, as well as to limit the signal caused by the avalanche current. The quenching circuit is preferably active, for example with the aid of a so-called discriminator which reduces the reverse voltage, but can alternatively also be passive, such as in the form of a resistor in series with the detector.

In a preferred embodiment, a maximum of 100 detectors, preferably a maximum of 50 detectors, are connected per row bus and per column bus.

As indicated, it is more efficient to limit the number of detectors per bus. In this way, it is easier to distinguish multiple events on a bus from each other, and stricter spatial conditions can be imposed.

On the basis of confirmed detections, the timestamp for the incident photons is only determined for this in the processing layer, which happens in prior art systems for every signal, including the false positives. The determination of this can be done in a number of ways by difference of timestamp on the separate aggregated signals that together led to the confirmed detection. For example, the earliest signal can always be chosen, as this means that there was already an impact at that time. Alternatively, an average of the timestamps associated with the confirmed detection can be chosen, in order to resolve (or at least, reduce the impact of) any hardware errors, for the median, or even for the last timestamp. Finally, additional information can be obtained from a difference in time between the timestamps associated with the different rows and columns, which can provide further insights about the incident photons.

In what follows, a number of specific embodiments will be discussed in practice, as well as with reference to schematic representations in the figures.

EXAMPLES

In a first example, the invention relates to a detection architecture adapted for very fast (i.e. over time spans of 10 ns or less) and low-threshold (i.e. with limited photon budgets) photon detection, and translation thereof to a clear digital signal to represent an event (effective detection of reflected light beam as opposed to ambient light or thermal noise).

FIG. 1 shows a schematic representation of a rudimentary version of the system according to the invention, comprising at least one light source (2) and one, preferably N, detectors or sensors (1) that capture a particular scene in the environment. The light source illuminates the scene with a light beam (laser or LED), typically in a pre-programmed pattern and/or in a sequential manner, such as scanning the scene through a light point (3) in a dynamic pattern (4). The N detectors (1) detect the position of the light point (3) in the scene, for example via triangulation based on the output of the different detectors.

Since the design of the invention is aimed at processing millions of voxels per second, without brute forcing the problem, the scanning speed must be very high, and its processing optimised given the limited photon budget and short time frame.

Figure 2:
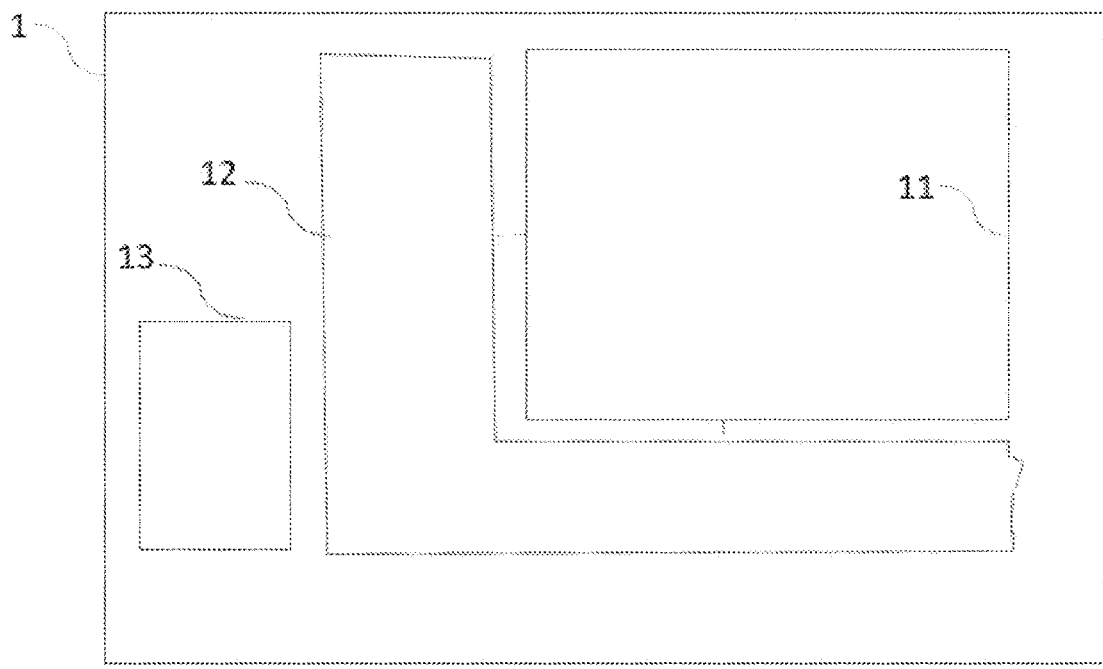
FIG. 2 shows a schematic representation of a system (1) according to an embodiment of the invention.

FIG. 2 shows a schematic representation of a system (1) according to an embodiment of the invention, wherein the system comprises a photosensitive zone (11), typically comprising an array of photosensitive elements or detectors (e.g., SPAD). The system further includes an evaluation circuit (12), which includes a logic circuit, such as a logic gate or variations thereof, connected to the photosensitive zone (11) and adapted to determine the validity of the data obtained from the detectors of the photosensitive zone. The system here further comprises a logic circuit (12) (when combined with a logic circuit for validating the data) for merging the data/signals obtained from the detectors into a (single) data stream. The system may also comprise a synchronisation component for synchronising the data stream and the optical signal from the light source(s) and/or the data from the different detectors.

Figure 3:
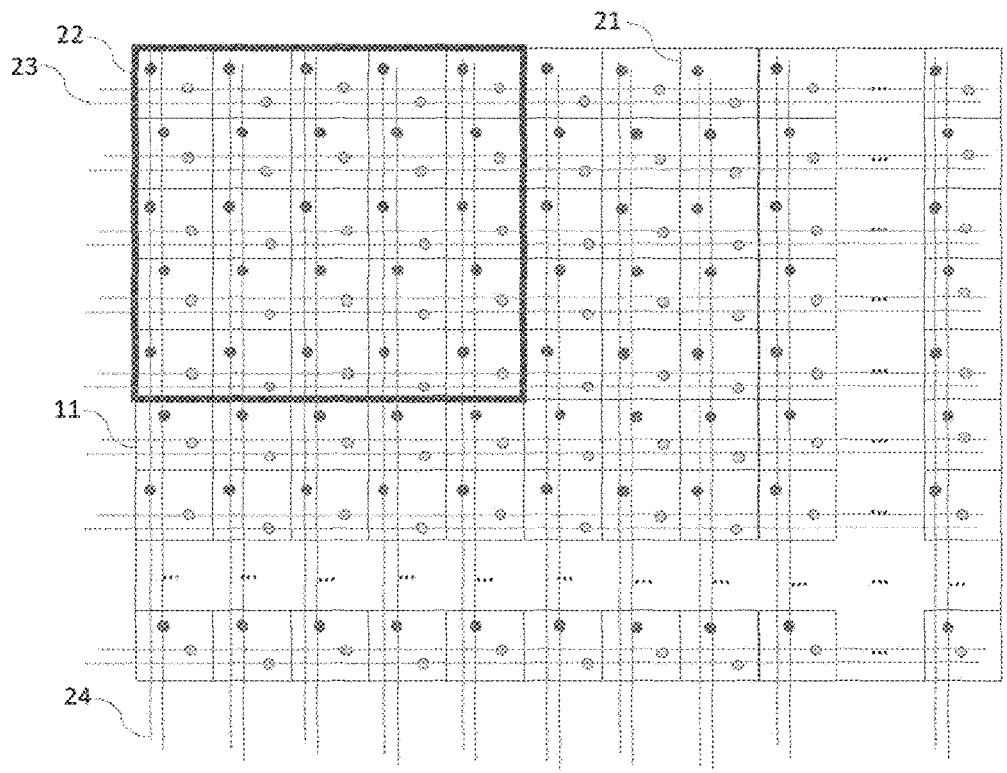
FIG. 3 shows a schematic representation of a photosensitive zone provided with detectors and connected to row and column buses.

In a first more specific version of this example, conceptually shown in FIG. 3, the photosensitive zone (11) comprises a plurality of SPADs (21) arranged in an array of M rows and N columns, each SPAD having a quenching circuit, passive or active, and wherein the SPADs are represented as a square cell. Note that the two connection points per cell are purely visual, serving as the connection point from the SPAD to a row and/or column bus. All SPADs are connected to a column bus (24) and to a row bus (23), where one or more buses are provided per row and/or column (preferably several buses per row and per column, although it is possible to connect all SPADs on a row or column to one bus). In FIG. 3, 2 row buses are used per row and 2 column buses per column, whereby the SPADs are alternately connected to one or the other bus. Alternatively, this can also be done sequentially (first X consecutive SPADs on first bus, rest on second bus).

Upon detection of a photon on SPAD, this will lead to detection of an event on the associated row and column bus.

Figure 4A:
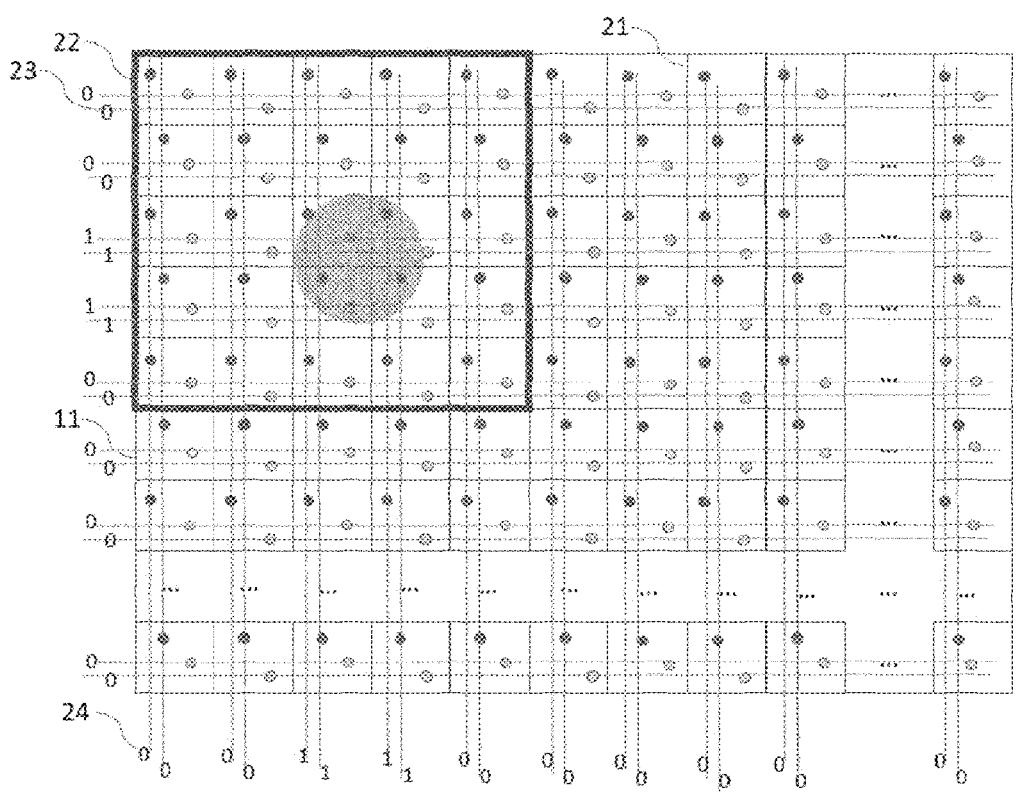
FIGS. 4A-C show further embodiments based on FIG. 3.
Figure 4B:
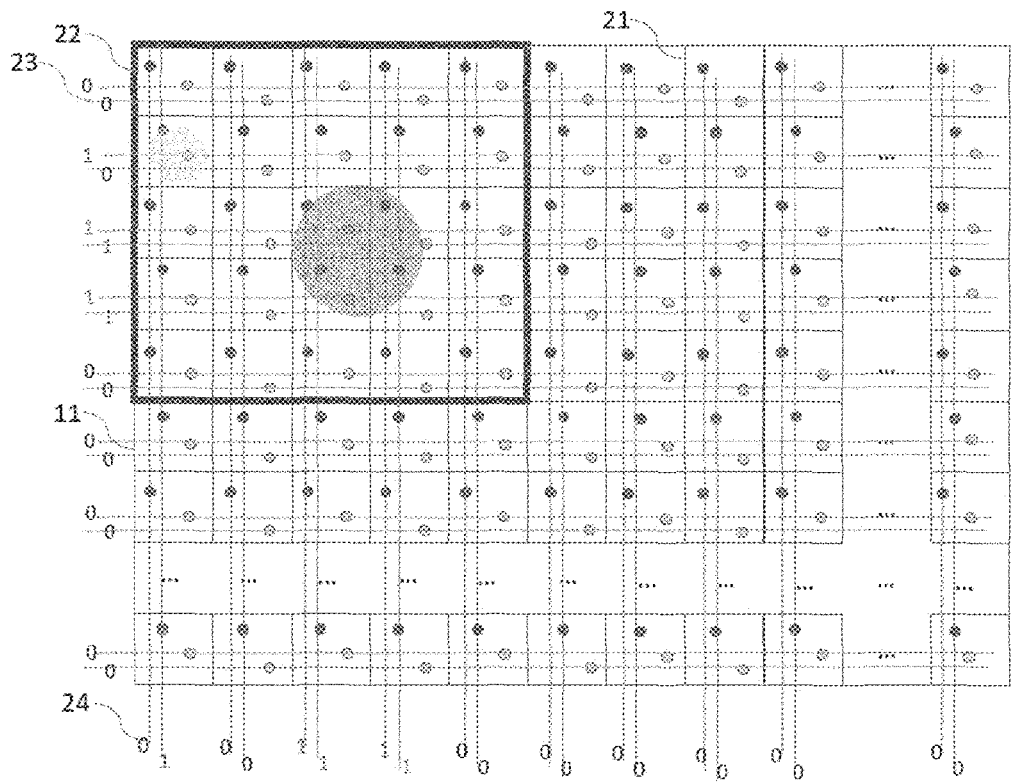

FIG. 4A shows the example of a photon impact detected on 4 different, adjacent SPADs (see circle). If any impact is sufficient to trigger a detection on the SPAD (low-energy impact may be insufficient to trigger the SPAD to avalanche breakdown), a detection is passed on on 4 row (group) buses and 4 column (group) buses, as shown by the signals on the left for the row buses, and at the bottom for the column buses. In FIG. 4B an event is also detected on a single SPAD (top left, second row, first column), which leads to a passed on detection on one row bus and one column bus.

The evaluation circuit (12) which receives the signals from the row and column buses hereby imposes a number of conditions for evaluating the incoming signals, to indicate a confirmed event or not. For example, the evaluation circuit will typically consider solitary events, such as the top left detection, as a false detection, while multiple detections on adjacent buses (such as on row 3-4, column 3-4) will typically be considered true events.

Figure 4C:
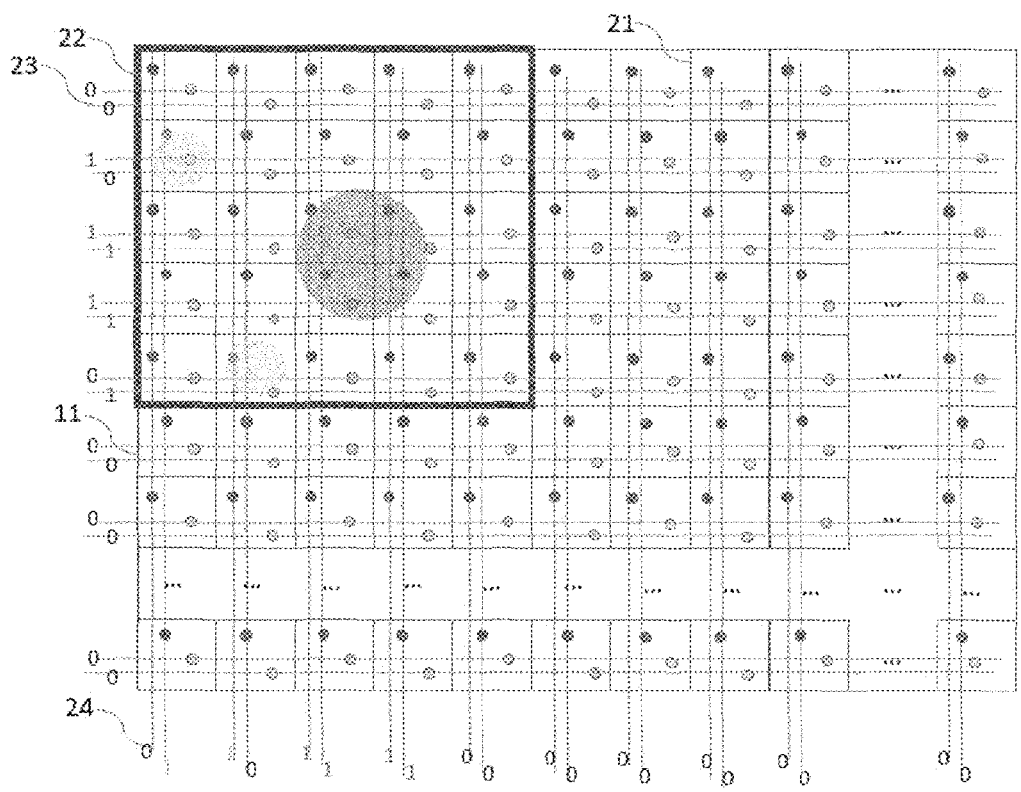

In FIG. 4C, an additional solitary event is detected on row 5, column 2. This leads to a supposed event on two adjacent column buses (column bus 2 and 3), which, however, originates from two separate events. However, by also taking the row buses into account, it can be seen that these are separate solitary events, both of which can be taken into account.

To avoid that solitary events can lead to a pattern that satisfies the conditions of the evaluation circuit (predetermined pattern or patterns), it is advantageous to provide enough buses per row and column of SPADs, as this limits the chance of accidentally observing events on adjacent buses in the same time frame.

However, true events (i.e. real impact of reflected light beam on array) will normally lead to detections that meet the conditions of the evaluation circuit, as the triggering is not limited to one SPAD, but will also trigger one or more adjacent SPADs, and moreover, in a very limited time frame, which will confirm the correlation between the individual detections when evaluated.

The invention hereby makes use of coincidence detection based on the spatial position of the pixels (detectors) in the array, by looking for confirmation patterns in the signals of the row and column buses, in order to determine whether a real photon packet (and thus a reflected light beam) was detected.

In FIG. 4C an additional measure is provided, namely limiting the detectors that are active/taken into account to a subset of the detectors, by means of a so-called 'enable window' (22). The term 'enable window' carries no limitation on shape or size, and may vary dynamically herein. This window acts as a predictive zone in which the light point is expected to be detected based on historical data (such as previous detections, movement pattern over previous detections, strength of ambient light, etc.). In this way, a substantial part of the SPADs are not taken into account for the location-determination of incidence of the light beam, which on the one hand greatly reduces the false positives (since they are largely randomly distributed, and by limiting the number of SPADs, the number of false detections is limited to the same degree), and on the other hand also limits the number of signals to be processed, and the buses are avoided from being saturated by solitary events.

Alternatively, or in addition to the foregoing, the sensitivity of the detectors can also be adjusted, dynamically or not, in order to avoid saturation of the column and/or row buses in this way. As a result, more energy will have to be used in the active optical signal (i.e. light source) to increase the probability of sufficient photons impinging together (coincidence). In this way background radiation and thermal noise can be filtered efficiently.

By defining a number of confirmation patterns, the system can be easily, quickly (and possibly dynamically) adapted for different situations. For example, in situations with limited ambient light, such as at night, indoors, etc., the spatial condition can be removed or relaxed. 'Undesired' events can also be filtered out by comparing the raw detections with an expected illumination pattern, which for example takes into account the pattern with which the lighting source scans the scene. Thus, in one embodiment, the light source may be programmed to scan the scene according to a Lissajous pattern, which will impact the observed detections, which will typically adopt a similar pattern, albeit distorted. In this case, strongly deviating detections from the expected illumination pattern can be rejected as noise and the like.

In addition, in certain embodiments, multiple 'confirmation flows' of evaluated detections matching different confirmation patterns may be held in parallel. In this way, these can be checked against measurements in later time spans in order to achieve greater certainty regarding which the correct confirmation flow was.

The communication from detector to bus can, for example, be done via a pull-down (or pull-up) element on the bus, whereby a detection generates a signal that ensures discharge of the pre-charged bus. At the end of each time span of detection, the buses are pre-charged again to wait for the occurrence or not of a detection by the SPAD. The advantage of this is that these pull-down discharges are very easily detectable by the evaluation circuit. Optionally, an amplifier circuit may be provided prior to discretising the signals.

Based on this, the system can provide a list per time span of locations in the array where confirmation patterns were detected.

In an alternative embodiment, the invention relates to a system in which the photosensitive part is implemented on 1 layer and the processing circuitry and logic on a 2nd layer. The layers are stacked on top of each other and connected with 1 or more electrical connections per pixel or per pixel group. Searching for expected detection patterns in the sensor can now be done even more locally, whereby instead of detection patterns on projections (row/column buses), a two-dimensional pattern can be searched for in each sub-window of the sensor array.

The invention further relates to a high-speed imaging sensor system, the system comprising one or more light sources, and comprising an array having a plurality of single-photon detectors (or SPDs), which detectors are spatially distributed throughout the array in a substantial matrix form, preferably at regular intervals from each other, wherein the SPD are capable of detecting single photons, and registering detection of the single photon with a detection signal; the system further comprising a plurality of buses, and wherein the detectors are grouped in clusters of two or more detectors, and wherein the detectors per cluster are connected to one bus for aggregating signals from the detectors of the cluster, only detectors from one of the clusters being connected per bus; the system further comprising an evaluation circuit, wherein the evaluation circuit is provided with the relative positioning of the clusters, the buses being connected to the evaluation circuit, the evaluation circuit being adapted to evaluate the aggregated signals from the buses against predetermined confirmation patterns to confirm the detection of an incident photon and locating thereof, wherein said confirmation patterns comprise temporal and/or spatial conditions, said confirmation patterns being based on, inter alia, the relative positioning of the clusters, and wherein a detection is confirmed by a compliance of the signals from buses with a predetermined pattern.

Another embodiment of the invention introduced a stacking layer in which the SPAD detector triggers are combined and analysed. When working on a single layer, the assertions need to be monitored on the 'projections', either on column and row buses, or different projections such as diagonal or other buses. The introduction of a second layer provide more local monitoring of SPAD detector clusters, monitoring their coinciding event creation. Due to the more local monitoring, less SPAD detector devices can be considered per cluster and saturation of the buses can be avoided when high amounts of ambient event are being generated.

Also, the assertion pattern can now be considered as a 2 dimensional assertion pattern that can be compared with each detection cluster under test. When a match is found with the wanted assertion pattern a detection can be considered with high confidence.

In an alternative embodiment, the invention relates to an array of pixels, wherein each pixel comprises one or more single-photon detectors, preferably SPADs. The pixels can (partially) overlap, whereby adjacent pixels can share detectors.

Due to thermal noise and background radiation incident on the pixels, the detectors will emit a detection signal at a rate equal to the DCR (dark count rate) and BGR (background rate). These events are not temporally correlated with each other, so the detectors will be triggered separately. By including in the confirmation pattern or temporal and spatial conditions that a detection is only confirmed when one or more SPADs in a pixel are triggered in a predetermined time frame, the acceptance of false positives is drastically reduced, since false positive events are not be correlated.

In contrast, when a pixel is irradiated with an active light beam (i.e. originating from illumination of the scene by the light source(s)) within the predetermined time span (of e.g. 10 ns), wherein the energy budget of the light beam is adjusted such that a SPAD or other detector illuminated by a reflected beam also effectively detects and thus triggers one or more photons, the probability also greatly increases that a pixel detects multiple events in the separate detectors or SPADs of the pixel. This further relies on coincidence detection. In the present invention, the principle of coincidence detection is used as a signal without providing an exact timestamp associated with the event, since only the location of the event on the array is needed.

A pixel can in this way detect coincidence events and pass them on to the column and row bus to indicate that an event has occurred.

The coincidence evaluation mechanism can be provided per pixel or alternatively per set of pixels. Alternatively, it can also be integrated in the periphery of the systems, which greatly simplifies the array itself, since no local coincidence evaluation is needed anymore, and only quenching circuits. Each SPAD will pass an observation to the row and/or column bus with which the SPAD is associated. The periphery can herein comprise a massive parallel connected digital circuit, which monitors the state of the bus over every predetermined time span (10 ns). If in this time span events are detected in:

2 adjacent columns and for the same line (in case a 2×1 confirmation pattern is sufficient); or 2 adjacent lines and for the same column (for a 1×2 confirmation pattern); or 2 adjacent lines and two adjacent columns (for a 2×2 confirmation pattern); or another predetermined confirmation pattern;

then an event is confirmed and reported. It can then optionally be time-stamped and communicated to a further device.

The present invention should not be construed as being limited to the embodiments described above and certain modifications or changes may be added to the examples described without having to re-evaluate the appended claims.

The invention claimed is:

1. A high speed imaging sensor system, comprising:
one or more light sources;
an array comprising a plurality of spatially distributed single-photon detectors (SPDs) in a substantial matrix form, the SPDs being configured to detect one or more single photons and register detection of the one or more single photons with a detection signal;
a plurality of row buses and column buses such that the SPDs are grouped in rows and columns, and
wherein the SPDs per row are connected to one or more row buses, and
wherein the SPDs per column are connected to one or more column buses on the column bus for aggregating signals from the SPDs, wherein per row bus, only SPDs from one of the rows are connected to the row bus for aggregating signals from the SPDs, wherein per column bus, only SPDs from one of the columns are connected; and an evaluation circuit, wherein the row buses and the column buses are connected to the evaluation circuit, the evaluation circuit being adapted to evaluate the aggregated signals from the row buses and the column buses against predetermined confirmation patterns to confirm the detection of an incident photon and location-determination thereof, wherein the confirmation patterns comprise temporal or spatial conditions, and wherein a detection is confirmed on the basis of a compliance of the row bus and column bus signals with a predetermined pattern, wherein the spatial conditions involve detecting an aggregated signal comprising a detection signal from at least two column buses associated with adjacent columns in a predetermined time window, or involves detecting an aggregated signal comprising a detection signal in at least two row buses associated with adjacent rows in a predetermined time window, wherein the temporal conditions concern a temporal overlap of detecting an aggregated signal comprising a detection signal from at least one row bus, and detecting an aggregated signal comprising a detection signal from at least one column bus, the location of the incidence of the photon on the array being determined on the basis of the column buses and row buses associated with a confirmed detection.

2. The system of claim 1, wherein the spatial conditions involve detecting an aggregated signal comprising a detection signal from at least two column buses associated with adjacent columns in a predetermined time window, and involve detecting an aggregated signal comprising a detection signal in at least two row buses associated with adjacent rows in a predetermined time window.

3. The system of claim 1, wherein the evaluation circuit provided as a parallel connected digital circuit is peripherally coupled to the row and column buses, and wherein the evaluation circuit monitors a status of the row and column buses for detection signals in the aggregated signal over every predetermined time span, and wherein upon detection of a detection signal in two adjacent column buses and/or in two adjacent row buses, the detection is confirmed and reported.

4. The system of claim 1, wherein the temporal conditions involve a temporal overlap of detecting an aggregated signal comprising a detection signal from at least two row buses associated with adjacent rows, and of detecting an aggregated signal comprising a detection signal from at least two column buses associated with adjacent columns, the location of the incidence of the photon on the array being determined on the basis of the column buses and row buses associated with a confirmed detection.

5. The system of claim 1, wherein each SPD is uniquely connected with one column bus and uniquely connected with one row bus.

6. The system of claim 5, wherein the array comprises M by N SPDs, which are positioned in a matrix with M rows and N columns, wherein per row the SPDs are distributed over two or more row groups of SPDs and wherein the same distribution of the SPDs per row continues over all rows, the SPDs of a row group being connected to a row bus associated with the row group, and wherein the spatial conditions additionally involve the detection of an aggregated signal comprising a detection signal in at least two row buses associated with adjacent row groups in a predetermined time window.

7. The system of claim 5, wherein the array comprises M by N SPDs, which are positioned in a matrix with M rows and N columns, wherein per column, the SPDs are distributed over two or more column groups of SPDs, and wherein the same distribution of the SPDs per column continues over all columns, the SPDs of a column group being connected to a column bus associated with the column group, and wherein the spatial conditions additionally involve the detection of an aggregated signal comprising a detection signal in at least two column buses associated with adjacent column groups in a predetermined time window.

8. The system of claim 1, wherein the SPDs are adapted to provide a signal to the connected row bus or column bus, the signal being substantially binary and representing whether or not the SPD detects incident photons.

9. The system of claim 1, wherein the system is adapted to precharge the row buses and column buses at fixed intervals, the row buses and column buses being adapted to discharge upon receipt of an aggregated signal comprising a detection signal.

10. The system of claim 1, wherein the evaluation circuit is adapted to check spatial consistency, wherein a last determination of the location of the photon incidence on the array is compared with one or more previous location-determinations, and wherein the evaluation circuit rejects the latest location-determination upon detection of a spatial discrepancy between the latest location-determination and the previous location-determinations above a predetermined upper limit.

11. The system of claim 1, wherein the system comprises a synchronization component for synchronizing the signals from the SPDs.

12. The system of claim 1, wherein the system is adapted to only consider signals from a variable subset of the SPDs in the evaluation circuit during imaging during a portion of an imaging procedure and not consider signals from SPDs in the subset, wherein the system selects the SPDs in the subset based on previous location-determinations and optionally based on orientation and/or positioning of the one or more light sources, wherein the SPDs in the subset comprise a maximum of 25% of the total number of SPDs, and the SPDs in a subset are grouped together.

13. The system of claim 1, wherein the system is adapted to activate only a variable subset of SPDs during imaging during a portion of an imaging procedure and not deactivate SPDs in the subset, wherein the system selects the SPDs in the subset based on previous location-determinations and optionally based on orientation and/or positioning of the one or more light sources, wherein the SPDs in the subset comprise a maximum of 25% of the total number of SPDs, and the SPDs in a subset are grouped together.

14. The system of claim 1, wherein the SPDs comprise single-photon avalanche diodes (SPAD).

15. The system of claim 1, wherein the SPDs are provided with a quenching circuit which normalizes the detection signal from the SPDs.

16. The system of claim 1, wherein a maximum of 100 SPDs are connected per row bus and per column bus.

17. The system of claim 1, wherein the evaluation circuit is adapted to check spatial consistency, wherein a last determination of the location of the photon incidence on the array is compared with one or more previous location-determinations, and wherein the evaluation circuit rejects the latest location-determination upon detection of a spatial discrepancy between the latest location-determination and the previous location-determinations above a predetermined, upper limit.

18. The system of claim 1, wherein the substantial matrix form comprises SPDs at regular intervals relative to each other.

19. The system of claim 1, wherein a maximum of 50 SPDs are connected per row bus and per column bus.

* * * * *